United States Patent
Becht et al.

(10) Patent No.: US 10,691,519 B2
(45) Date of Patent: Jun. 23, 2020

(54) HANG DETECTION AND RECOVERY

(71) Applicant: International Business Machines Corporation, Armonk, NY (US)

(72) Inventors: Michael J. Becht, Poughkeepsie, NY (US); Yuen C. Tschang, Wappingers Falls, NY (US); Raymond Wong, Hopewell Junction, NY (US); Jie Zheng, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 595 days.

(21) Appl. No.: 15/266,212

(22) Filed: Sep. 15, 2016

(65) Prior Publication Data
US 2018/0074875 A1    Mar. 15, 2018

(51) Int. Cl.
*G06F 11/00* (2006.01)
*G06F 11/07* (2006.01)

(52) U.S. Cl.
CPC ........ *G06F 11/073* (2013.01); *G06F 11/0757* (2013.01)

(58) Field of Classification Search
CPC ............ G06F 11/0757; G06F 11/0751; G06F 11/0766; G06F 17/30554; G06F 17/30994; H04L 1/188
See application file for complete search history.

(56) References Cited

U.S. PATENT DOCUMENTS

| | | | | | |
|---|---|---|---|---|---|
| 4,234,919 | A | * | 11/1980 | Bruce | G06F 13/36 710/306 |
| 4,236,209 | A | * | 11/1980 | Lombardo, Jr. | G06F 13/36 709/218 |
| 4,438,298 | A | * | 3/1984 | Rubin | H04M 3/30 379/29.01 |
| 4,521,848 | A | * | 6/1985 | Bruce | G06F 13/36 714/43 |
| 5,253,214 | A | * | 10/1993 | Herrmann | G06F 12/0215 365/203 |
| 5,471,488 | A | * | 11/1995 | Bender | G06F 1/04 307/406 |

(Continued)

FOREIGN PATENT DOCUMENTS

CN    101668233 B    1/2013
JP    56082926 A    7/1981

*Primary Examiner* — Bryce P Bonzo
*Assistant Examiner* — Jeison C Arcos
(74) *Attorney, Agent, or Firm* — Cantor Colburn LLP; Steven Chiu (57) ABSTRACT

Examples of techniques for hang detection and recovery are disclosed. In one example implementation according to aspects of the present disclosure, a computer-implemented method may include: sending, by a processor, a read request to a controller; detecting, by a data hang detection circuit, the read request; initiating, by the data hang detection circuit, a counter when the read request is first detected; monitoring, by the data hang detection circuit, to receive a read response from the controller; and responsive to the counter reaching a timeout threshold before receiving the read response, sending, by the data hang detection circuit a timeout error to the processor via a multiplexer in the data hang detection circuit.

15 Claims, 4 Drawing Sheets

(56) References Cited

U.S. PATENT DOCUMENTS

| | | | | |
|---|---|---|---|---|
| 5,819,053 | A * | 10/1998 | Goodrum | G06F 11/349 710/100 |
| 5,872,939 | A * | 2/1999 | Ramsey | G06F 13/364 710/120 |
| 6,032,271 | A * | 2/2000 | Goodrum | G06F 11/2005 710/100 |
| 6,075,929 | A * | 6/2000 | MacLaren | G06F 12/0215 710/107 |
| 6,098,137 | A * | 8/2000 | Goodrum | G06F 11/2005 370/402 |
| 6,321,286 | B1 * | 11/2001 | Goodrum | G06F 11/2005 370/402 |
| 6,453,429 | B1 * | 9/2002 | Sadana | G06F 11/0745 714/43 |
| 6,496,890 | B1 | 12/2002 | Azevedo et al. | |
| 8,261,134 | B2 * | 9/2012 | Abts | G06F 11/0724 713/502 |
| 2002/0013915 | A1 * | 1/2002 | Migita | G06F 3/0613 714/6.13 |
| 2004/0139372 | A1 * | 7/2004 | Moyer | G06F 11/004 714/43 |
| 2006/0203716 | A1 * | 9/2006 | Gilligan | H04L 1/0061 370/216 |
| 2007/0101206 | A1 * | 5/2007 | Brabant | G06F 11/0757 714/55 |
| 2007/0291646 | A1 * | 12/2007 | Ohishi | H04L 1/1678 370/236 |
| 2010/0070697 | A1 * | 3/2010 | Saito | G06F 13/1605 711/105 |
| 2011/0113279 | A1 * | 5/2011 | Cagno | G06F 11/2089 714/5.11 |
| 2013/0024734 | A1 * | 1/2013 | Katsuragi | G06F 3/0611 714/55 |
| 2013/0067161 | A1 * | 3/2013 | Chandra | G06F 13/12 711/114 |
| 2013/0275391 | A1 * | 10/2013 | Batwara | G06F 16/125 707/689 |
| 2014/0078926 | A1 * | 3/2014 | Nishioka | G06F 11/0757 370/252 |
| 2017/0329686 | A1 * | 11/2017 | Bhagwat | G06F 11/26 |

* cited by examiner

HANG DETECTION AND RECOVERY

BACKGROUND

The present disclosure relates generally to processing data in a processing system and, more particularly, to techniques for hang detection and recovery in a processing system.

In existing processing systems, a read request may be issued during type2 recovery. However, an endpoint, such as a controller, may fail to return completion data. Consequently, the processing system hangs while waiting for the read completion data and cannot service type2 critical interrupts.

SUMMARY

According to examples of the present disclosure, techniques including methods, systems, and/or computer program products for hang detection and recovery are provided. An example method may include: sending, by a processor, a read request to a controller; detecting, by a data hang detection circuit, the read request; initiating, by the data hang detection circuit, a counter when the read request is first detected; monitoring, by the data hang detection circuit, to receive a read response from the controller; and responsive to the counter reaching a timeout threshold before receiving the read response, sending, by the data hang detection circuit a timeout error to the processor via a multiplexer in the data hang detection circuit.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

DETAILED DESCRIPTION

To enable the processor to make forward progress, a mechanism between the processor and a controller needs to generate an error completion back to the processor after a timeout. To accomplish this, the present disclosure provides a small amount of logic (i.e., a data hang detection circuit) added between the processor and the controller that utilizes a multiplexer (MUX) and a counter. In particular, the data hang detection circuit is used to detect or "snoop" requests from the processor and generate a timeout error to signal the processor when a timeout occurs. The MUX takes as an input a signal from the counter that goes high when a timeout period is reached. The multiplexer also takes as an input a signal from a controller when a read response is generated. When either of the signals (from the counter or from the controller) goes high, the MUX sends an indication to the processor. This prevents the processor from hanging and becoming unable to service type2 critical interrupts.

Example embodiments of the disclosure include or yield various technical features, technical effects, and/or improvements to technology. Example embodiments of the disclosure provide hang detection and recovery techniques for a processing system. The hang detection and recover techniques utilize a multiplexer and a counter in a data hang detection circuit to generate a timeout error when the counter exceeds a timeout threshold. These aspects of the disclosure constitute technical features that yield the technical effect of preventing the processing system from hanging and becoming unable to process additional tasks. As a result of these technical features and technical effects, the hang detection and recovery techniques in accordance with example embodiments of the disclosure represents an improvement to existing processing systems. It should be appreciated that the above examples of technical features, technical effects, and improvements to technology of example embodiments of the disclosure are merely illustrative and not exhaustive.

Figure 1:
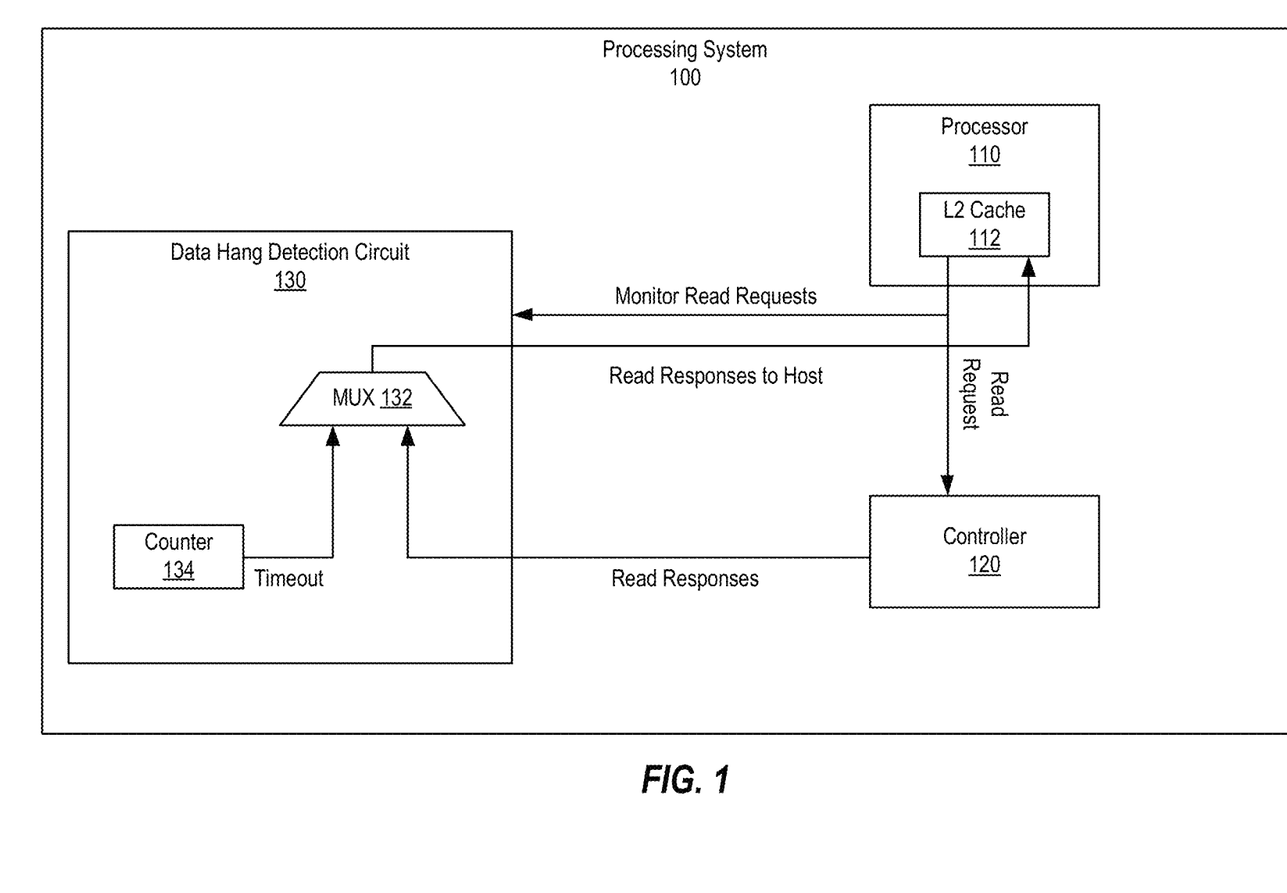
FIG. 1 illustrates a block diagram of a processing system for hang detection and recovery according to examples of the present disclosure.

FIG. 1 illustrates a block diagram of a processing system 100 for hang detection and recovery according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processor 110 for executing those instructions. Thus a system memory can store program instructions that when executed by a processor 110 implement the engines described herein. Other engines may also be utilized to include other features and functionality described in other examples herein.

Processing system 100 may include the processor 110, a controller 120, and a data hang detection circuit 130. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In examples, the processor 110 may be a PowerPC 476 (PPC) processor and may include a cache memory such as L2 cache 112. The controller 120 may be a PLB6 controller or other suitable controller.

The data hang detection circuit 130 between the processor 110 and the controller 120 monitors a bus between the L2 cache 112 and the controller 120 for read requests that are sent to a data tenure phase. In other words, the controller 120 has been acknowledged (ACKed) and is waiting for data. When the controller 120 enters data tenure, a counter 134 in the data hang detection circuit 130 begins. If the counter expires, a time out signal is generated by the multiplexer (MUX) 132 and is sent back to the L2 cache 112 to finish the data tenure. This prevents the processor 110 from hanging while waiting for read completion data. If, however, the controller 120 completes the data tenure before the counter 134 expires, a read response is sent from the controller 120 to the MUX 132 of the data hand detection logic, and the read response is transmitted back to the processor 110.

The data hang detection circuit 130 utilizes its own clock (e.g., counter 134), which can track multiple requests (e.g., 24 requests, 32 requests, 64 requests) using multiple slots (e.g., 32 slots for the 32 requests). The counter 134 may be configured with a predetermined waiting time (e.g., 30 clock cycles, 500 clock cycles, etc.) and may be changed as desired.

The data hang detection circuit 130 runs at the same clock same speed as the controller 120 (e.g., 500 MHz). This enables the counter 134 of the data hang detection circuit 130 to remain synchronized with the controller 120 so that time out commands are issued accurately. In some examples, requests use tags, known as mtags, which the data hang detection circuit 130 can snoop and detect as the requests are passed from the processor 110 to the controller 120.

According to aspects of the present disclosure, one example of pseudocode that may execute on the processing system 100 to implement the techniques described herein may be as follows:

```
Read cmd from processor
Monitor Request
    O_mM_req
    O_mM_read = 1
    O_mM_mtag(0:4) saved
    O_mM_size(0:2) saved
Monitor Response
    I_mM_comb_val
    I_mM_comb_resp(0:1) = 01 (ack)
Start timer if ack = 01
Monitor
    I_mM_rd_enable
    I_mM_rd_val
    I_mM_rd_mtag(0:4)
If a timeout occurs, send back response for request with error
    I_mM_rd_enable
    I_mM_rd_val
    I_mM_rd_mtag(0:4)
    I_mM_rd_err
```

Figure 2:
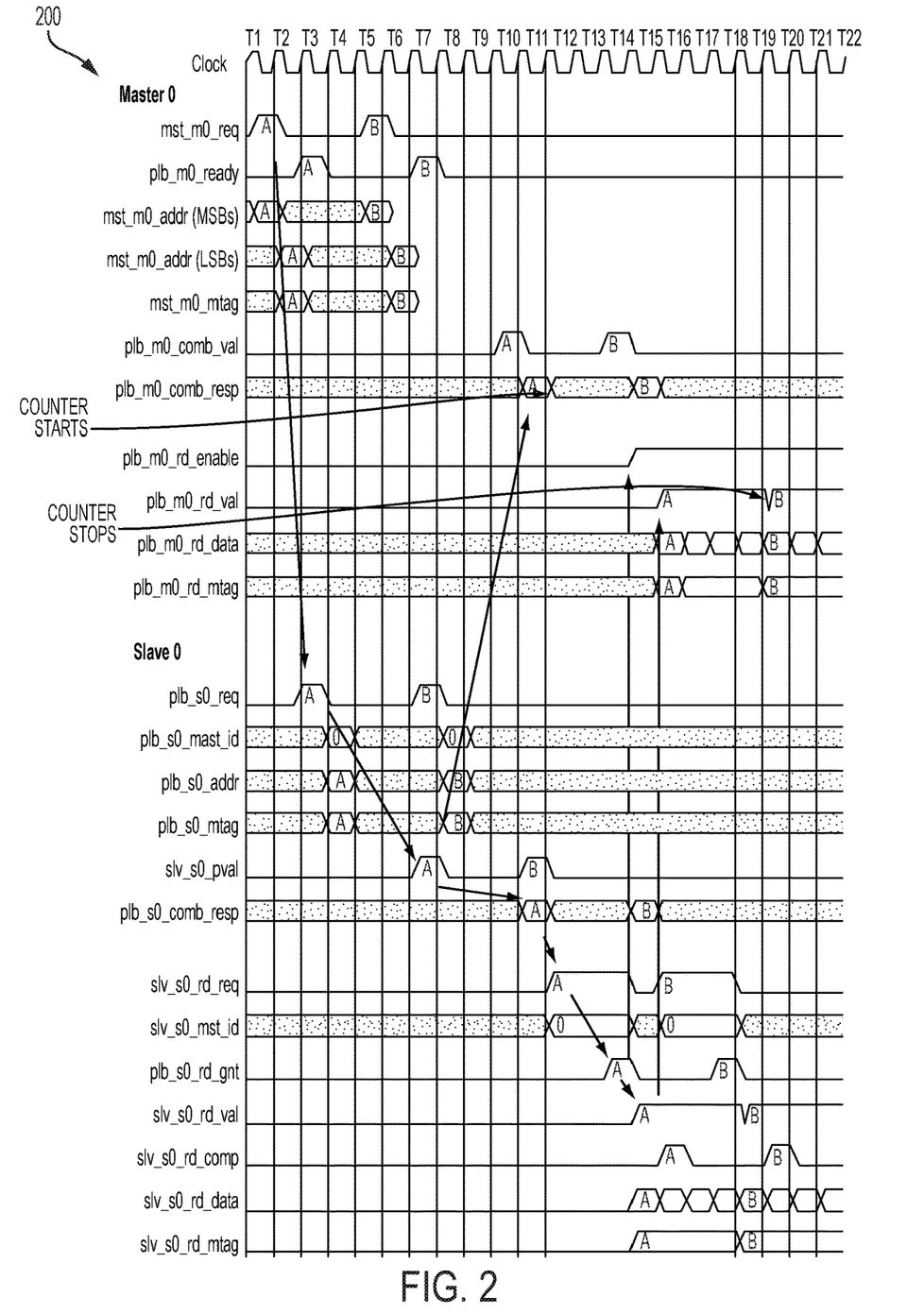
FIG. 2 illustrates a timing graph 200 of an implementation hang detection and recovery according to aspects of the present disclosure.

FIG. 2 illustrates a timing graph 200 of an implementation hang detection and recovery according to aspects of the present disclosure. It should be appreciated that the timing graph 200 utilizes a master 0 and a slave 0. The master 0 may be a processor such as the processor 110 of FIG. 1, and the slave 0 may be a controller such as the controller 120 of FIG. 1. It should be appreciated that this approach is applicable to other master/slave interactions over a bus. The counter such as the counter 134 of FIG. 1 may go off at any time between, depending on the timeout settings of the counter.

Figure 3:
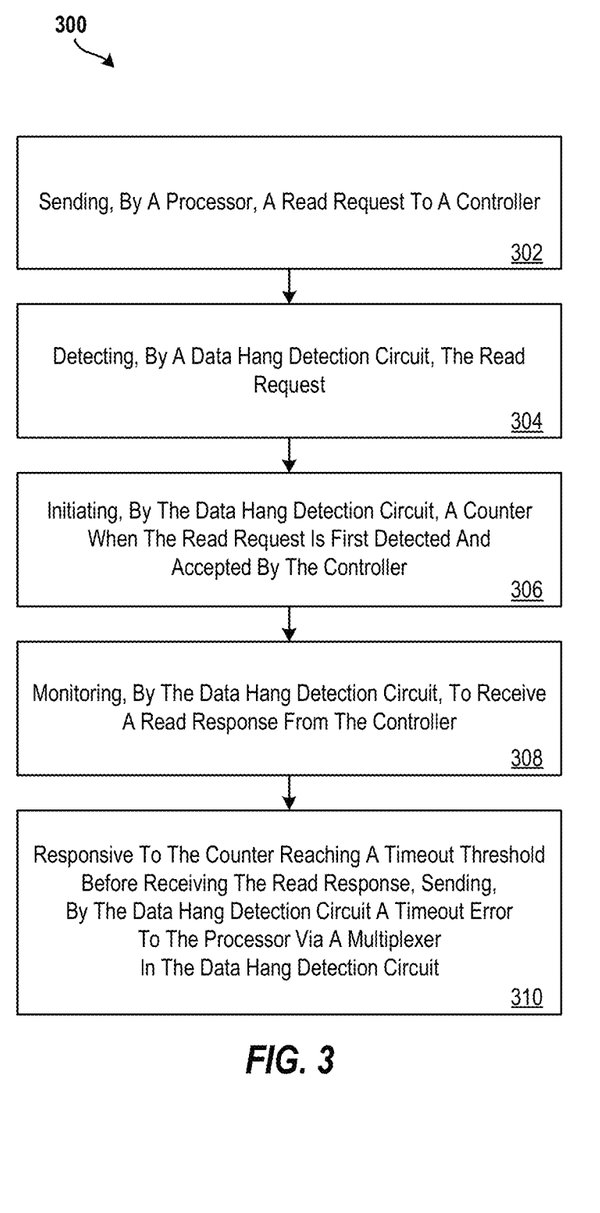
FIG. 3 illustrates a flow diagram of a method 300 for hang detection and recovery according to examples of the present disclosure.

FIG. 3 illustrates a flow diagram of a method 300 for hang detection and recovery according to examples of the present disclosure. The method 300 may be performed, for example, by a processing system such as the processing system 100 of FIG. 1, by the processing system 20 of FIG. 4, or by another suitable processing system.

At block 302, the method 300 includes sending, by a processor, a read request to a controller.

At block 304, the method 300 includes detecting, by a data hang detection circuit, the read request. detecting the read request comprises detecting a tag in the read request when the read request is sent by the processor to the controller. According to aspects of the present disclosure, detecting the read request comprises detecting a tag (e.g., an "mtag") in the read request when the read request is sent by the processor to the controller.

At block 306, the method 300 includes initiating, by the data hang detection circuit, a counter when the read request is first detected. It should be appreciated that, in some examples, the counter is only initiated when a read request is detected at block 304 and the request is accepted (acked). If the read request is not accepted (acked), then the counter does not start. If the read request is retried, the counter does not start and the mtag is recycled for use with a future read request. In examples, the counter and the controller are synchronized to the same clock cycle.

At block 308, the method 300 includes monitoring, by the data hang detection circuit, to receive a read response from the controller.

At block 310, the method 300 includes, responsive to the counter reaching a timeout threshold before receiving the read response, sending, by the data hang detection circuit a timeout error to the processor via a multiplexer in the data hang detection circuit. The multiplexer multiplexes a timeout signal generated by the counter when the counter reaches the timeout threshold and the read response generated by the controller. Accordingly, it should be appreciated that only one of the read response and the timeout error is sent to the processor via the multiplexer responsive to the read request.

It should be appreciated that, in additional examples, the method 300 may repeat for additional requests. Multiple tasks can therefore be tracked using the present techniques.

Additional processes also may be included. For example, the method 300 may include, responsive to the controller sending the read response before the counter reaches the timeout threshold, sending, by the data hang detection circuit, the read response to the processor via the multiplexer in the data hang detection circuit. It should be understood that the processes depicted in FIG. 3 represent illustrations, and that other processes may be added or existing processes may be removed, modified, or rearranged without departing from the scope and spirit of the present disclosure.

Figure 4:
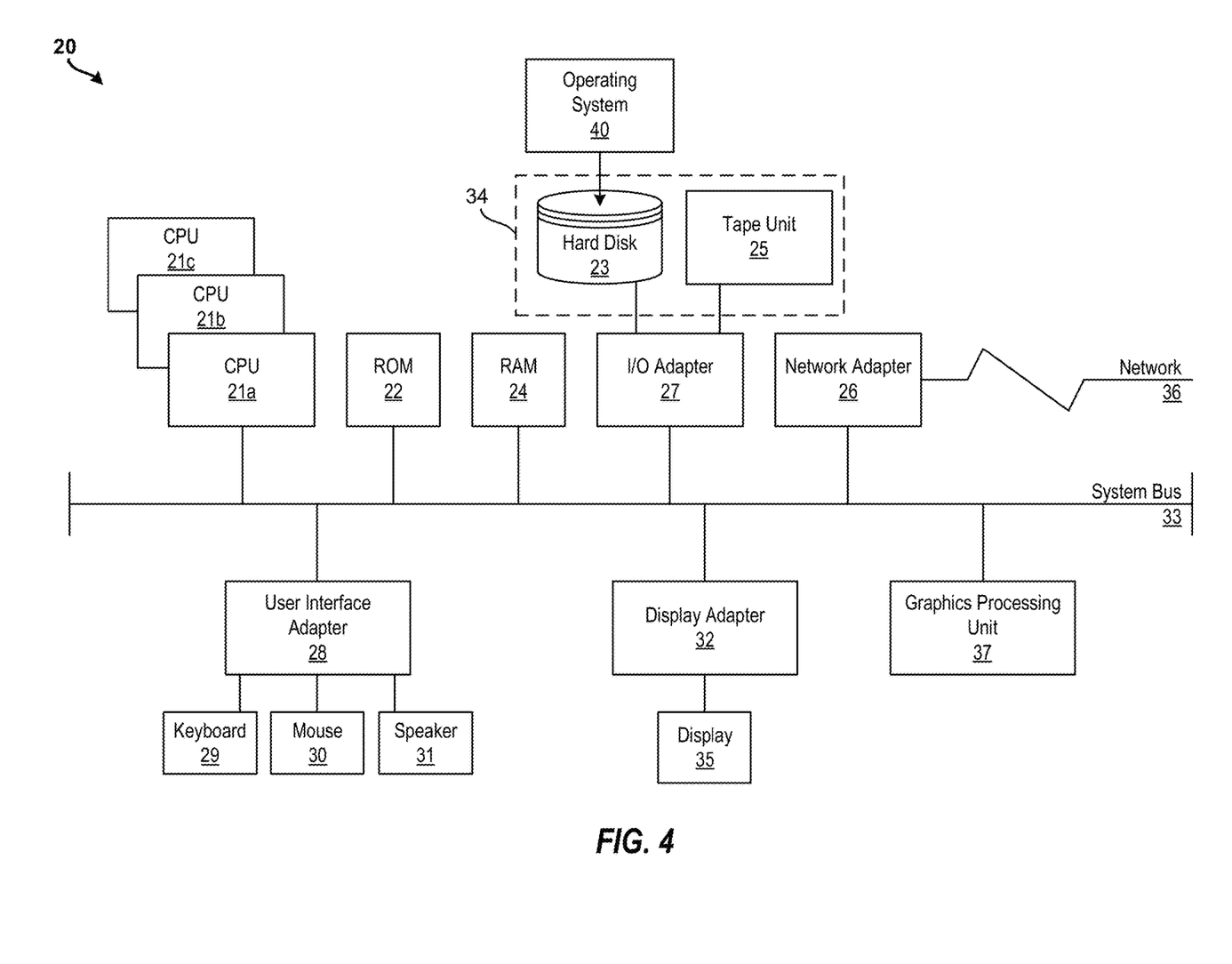
FIG. 4 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 4 illustrates a block diagram of a processing system 20 for implementing the techniques described herein. In examples, processing system 20 has one or more central processing units (processors) 21*a*, 21*b*, 21*c*, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for hang detection and recovery, the method comprising:
    sending, by a processor, a read request to a controller;
    detecting, by a data hang detection circuit, the read request being sent to the controller and detecting an acknowledgement sent by the controller that receipt of the read request is acknowledged by the controller;
    responsive to detecting the read request being sent to the controller and detecting the acknowledgment, initiating, by the data hang detection circuit, a counter when the read request is first detected and acknowledged by the controller;
    monitoring, by the data hang detection circuit, to receive a read response from the controller; and
    responsive to the counter reaching a timeout threshold before receiving the read response, sending, by the data hang detection circuit, a timeout error to the processor via a multiplexer in the data hang detection circuit.

2. The computer-implemented method of claim 1, wherein the counter and the controller are synchronized to the same clock cycle.

3. The computer-implemented method of claim 1, wherein only one of the read response and the timeout error is sent to the processor via the multiplexer responsive to the read request.

4. The computer-implemented method of claim 1, further comprising, responsive to the controller sending the read response before the counter reaches the timeout threshold, sending, by the data hang detection circuit, the read response to the processor via the multiplexer in the data hang detection circuit.

5. The computer-implemented method of claim 1, wherein the multiplexer multiplexes a timeout signal generated by the counter when the counter reaches the timeout threshold and the read response generated by the controller.

6. A system for hang detection and recovery, the system comprising:
    a memory having computer readable instructions; and
    a processor for executing the computer readable instructions, the computer readable instructions comprising:
        sending, by a processor, a read request to a controller;
        detecting, by a data hang detection circuit, the read request being sent to the controller and detecting an acknowledgement sent by the controller that receipt of the read request is acknowledged by the controller;
        responsive to detecting the read request being sent to the controller and detecting the acknowledgment, initiating, by the data hang detection circuit, a counter when the read request is first detected and acknowledged by the controller;
        monitoring, by the data hang detection circuit, to receive a read response from the controller; and
        responsive to the counter reaching a timeout threshold before receiving the read response, sending, by the data hang detection circuit a timeout error to the processor via a multiplexer in the data hang detection circuit.

7. The system of claim 6, wherein the counter and the controller are synchronized to the same clock cycle.

8. The system of claim 6, wherein only one of the read response and the timeout error is sent to the processor via the multiplexer responsive to the read request.

9. The system of claim 6, the computer readable instructions further comprising, responsive to the controller sending the read response before the counter reaches the timeout threshold, sending, by the data hang detection circuit, the read response to the processor via the multiplexer in the data hang detection circuit.

10. The system of claim 6, wherein the multiplexer multiplexes a timeout signal generated by the counter when the counter reaches the timeout threshold and the read response generated by the controller.

11. The system of claim 6, wherein the read request is a first read request, and wherein the read response is a first read response, the computer readable instructions further comprising:
    sending, by the processor, a second read request to the controller;
    detecting, by the data hang detection circuit, the second read request;
    initiating, by the data hang detection circuit, the counter when the second read request is first detected;
    monitoring, by the data hang detection circuit, to receive a second read response from the controller; and responsive to the counter reaching the timeout threshold before receiving the second read response, sending, by the data hang detection circuit the timeout error to the processor via the multiplexer in the data hang detection circuit.

12. The system of claim 11, the computer readable instructions further comprising, responsive to the controller sending the second read response before the counter reaches the timeout threshold, sending, by the data hang detection circuit, the second read response to the processor via the multiplexer in the data hang detection circuit.

13. The system of claim 6, wherein detecting the read request comprises detecting a tag in the read request when the read request is sent by the processor to the controller.

14. A computer program product for hang detection and recovery, the computer program product comprising:
   a computer readable storage medium having program instructions embodied therewith, the program instructions executable by a processing device to cause the processing device to:
      sending, by the processing device, a read request to a controller;
      detecting, by a data hang detection circuit, the read request being sent to the controller and detecting an acknowledgement sent by the controller that receipt of the read request is acknowledged by the controller;
      responsive to detecting the read request being sent to the controller and detecting the acknowledgment, initiating, by the data hang detection circuit, a counter when the read request is first detected and acknowledged by the controller;
      monitoring, by the data hang detection circuit, to receive a read response from the controller; and
      responsive to the counter reaching a timeout threshold before receiving the read response, sending, by the data hang detection circuit a timeout error to the processor via a multiplexer in the data hang detection circuit.

15. The computer program product of claim 14, wherein the counter and the controller are synchronized to the same clock cycle.

* * * * *